(12) United States Patent
Laudij et al.

(10) Patent No.: US 12,406,153 B2
(45) Date of Patent: Sep. 2, 2025

(54) DYNAMIC CONTRARIAN VIEW ANALYSIS IN NATURAL LANGUAGE CONTENT

(71) Applicant: Causality Link LLC, Cottonwood Heights, UT (US)

(72) Inventors: Olav Laudij, San Diego, CA (US); Pierre Haren, Cottonwood Heights, UT (US); Eric David Jensen, Sandy, UT (US); Craig Matthew Trim, Ventura, CA (US)

(73) Assignee: Causality Link LLC, Cottonwood Heights, UT (US)

( * ) Notice: Subject to any disclaimer, the term of this patent is extended or adjusted under 35 U.S.C. 154(b) by 317 days.

(21) Appl. No.: 18/120,688

(22) Filed: Mar. 13, 2023

(65) Prior Publication Data
US 2024/0311578 A1    Sep. 19, 2024

(51) Int. Cl.
*G06F 40/40* (2020.01)
*G06F 40/103* (2020.01)

(52) U.S. Cl.
CPC .......... *G06F 40/40* (2020.01); *G06F 40/103* (2020.01)

(58) Field of Classification Search
CPC ............................... G06F 40/40; G06F 40/103
See application file for complete search history.

(56) References Cited

U.S. PATENT DOCUMENTS

| | | | |
|---|---|---|---|
| 8,346,702 B2 | 1/2013 | Busch et al. | |
| 9,087,048 B2 | 7/2015 | Myslinski | |
| 9,104,746 B1 * | 8/2015 | Nayar | G06F 16/24578 |
| 9,569,729 B1 | 2/2017 | Oehrle et al. | |
| 9,860,337 B1 * | 1/2018 | Brown | G06F 40/30 |
| 2014/0136707 A1 * | 5/2014 | Beaty | H04L 63/0428 709/226 |
| 2014/0344279 A1 * | 11/2014 | Shah | G06F 16/35 707/738 |
| 2015/0199763 A1 * | 7/2015 | Birkhead | G06Q 40/06 705/36 R |
| 2016/0171369 A1 * | 6/2016 | Majumdar | G06F 40/289 706/46 |
| 2017/0270425 A1 * | 9/2017 | Danson | G06F 40/279 |

(Continued)

FOREIGN PATENT DOCUMENTS

WO    2022204435 A2    9/2022

OTHER PUBLICATIONS

Banerjee et al., Hunting the quicksilver: Using textual news and causality analysis to predict market volatility, vol. 77, Oct. 31, 2021.

(Continued)

*Primary Examiner* — Brian L Albertalli
(74) *Attorney, Agent, or Firm* — Garg Law Firm, PLLC; Rakesh Garg

(57) ABSTRACT

From a first content including a first assertion, using a natural language processing engine, a plurality of knowledge blocks is extracted. A metric corresponding to a first knowledge block in the plurality of knowledge blocks is computed, the metric evaluating a corpus of content against the first knowledge block. By comparing the metric with the first knowledge block, the first assertion is identified as a contrarian assertion. An indication of the contrarian assertion is caused to become visually associated with a portion of the first content on a presentation device.

20 Claims, 10 Drawing Sheets

(56) References Cited

U.S. PATENT DOCUMENTS

| | | | |
|---|---|---|---|
| 2017/0309193 A1* | 10/2017 | Joseph | G09B 5/02 |
| 2018/0189691 A1* | 7/2018 | Oehrle | G06N 7/01 |
| 2018/0225582 A1* | 8/2018 | Ashrafi | G06Q 30/0251 |
| 2019/0384814 A1* | 12/2019 | Mcgoldrick | G06N 3/044 |
| 2020/0192952 A1 | 6/2020 | Luus et al. | |
| 2021/0019339 A1 | 1/2021 | Ghulati et al. | |
| 2022/0277403 A1 | 9/2022 | Warden | |
| 2023/0135293 A1* | 5/2023 | Chien | G06F 40/279 |
| | | | 704/9 |
| 2023/0306345 A1* | 9/2023 | Yates | G06F 40/295 |

OTHER PUBLICATIONS

Coan et al., Computer-assisted classification of contrarian claims about climate change, Scientific Reports, 2021.

Heshmat et al., What Is Confirmation Bias?, Psychology Today, Apr. 23, 2015, https://www.psychologytoday.com/us/blog/science-choice/201504/what-is-confirmation-bias.

Jackson et al., What is Contrarian Investing?, Forbes Advisor, Oct. 11, 2022, https://www.forbes.com/advisor/investing/contrarian-investing/.

Johnson, The Dangers of Confirmation Bias, Nov. 21, 2017, https://www.huffpost.com/entry/the-dangers-of-confirmati_b_12960958.

Palay, Embracing Contrarian Viewpoints, Mar. 8, 2018, https://www.linkedin.com/pulse/embracing-contrarian-viewpoints-daniel-palay/.

Schumaker, Sentiment Analysis of Financial News Articles, Jan. 2009.

\* cited by examiner

*Fig. 4*

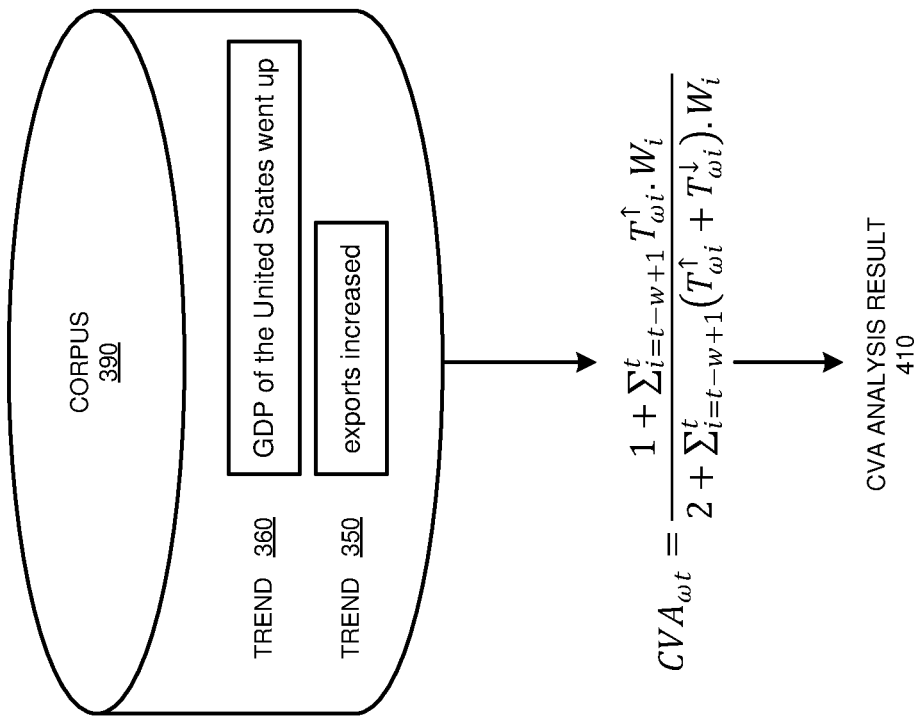

$T^\uparrow$ DENOTES AN UPTREND.
$T^\downarrow$ DENOTES A DOWNTREND.
THE SUBSCRIPT t REFERS TO THE DAY FOR WHICH THE CVA IS COMPUTED, WITH RESPECT TO A WINDOW w.
THE PARAMETER REFERS TO A SUBSET OF TRENDS.

WEIGHT w IS COMPUTED USING $\quad W_i = 2^{-\frac{t-i}{h}}$

IN WHICH t REFERS TO THE DAY THE CVA IS COMPUTED FOR, i REFERS TO THE DATE THE TREND MENTION WAS PUBLISHED AND h REFERS TO A HALF-LIFE.

$$CVA_{\omega t} = \frac{1 + \sum_{i=t-w+1}^{t} T^\uparrow_{\omega i} \cdot W_i}{2 + \sum_{i=t-w+1}^{t} (T^\uparrow_{\omega i} + T^\downarrow_{\omega i}) \cdot W_i}$$

DYNAMIC CONTRARIAN VIEW ANALYSIS IN NATURAL LANGUAGE CONTENT

BACKGROUND

The present invention relates generally to a method, system, and computer program product for natural language content analysis. More particularly, the present invention relates to a method, system, and computer program product for dynamic contrarian view analysis in natural language content.

A content, or portion of content, includes a text document expressed as human language, a text document in a structured format, speech, video, or a combination of one or more of text, speech, and video. Some non-limiting examples of content are newspaper and magazine articles, books, blog and social media posts, emails, video presentations, audio-video presentations, and the like. Natural language content is content expressed in a human language, such as English or French. The illustrative embodiments recognize that, on some topics, the volume of natural language content produced is sufficiently large that understanding a consensus view, identifying a contrarian view (a view contrary to a consensus view), identifying whether a view is novel or not, and other forms of differentiating important information (i.e., signal) from unimportant information (i.e., noise) is too difficult for humans to perform. For example, one available licensed collection of news articles includes seven years of articles, written in 27 languages, with 50,000 new articles added to the collection each day. Not only does processing this much information take too much, time, evaluating each portion of content often requires specialized knowledge. For example, within one collection of articles about financial information, each might include analysis of one economic statistic, or a particular industry, company, or commodity. It is impractical for one analyst to understand the entirety of those articles and identify inconsistencies, and different analysts might themselves have different opinions. Further, analysts typically specialize in different areas (e.g., different industry sectors such as semiconductors, travel, and pharmaceuticals), and thus are unlikely to discover a correlation between an event (e.g., the outbreak of COVID-19) and disparate industries (e.g., air travel demand and semiconductor production decreasing). The collection might also include non-obvious or unexpected connections between distinct facts, which a human analyst is likely to miss, particularly when the causal connection includes multiple steps or involves obscure factors.

Identifying contrarian views of the past is useful in fact checking, as a content that expresses a contrarian view of a well-known fact is likely to be incorrect. For example, a content that explains that the Earth is flat is contrary to the consensus view that the Earth is round, and thus the content is likely to be incorrect. Contrarian views of the future and previously unrecognized causal links are useful in identifying investment ideas and topics for scientific research. In addition, identifying contrarian views of the future and previously unrecognized causal links as quickly as possible is often important in implementing and adjusting investments before others have the opportunity to do so. Thus, a dynamic implementation, performed as soon as possible after content is created or received, is needed.

Thus, the illustrative embodiments recognize that there is a need to dynamically determine consensus and contrarian views expressed in a corpus of content.

SUMMARY

The illustrative embodiments provide a method, system, and computer program product. An embodiment includes a method that extracts, from a first content including a first assertion, using a natural language processing engine, a plurality of knowledge blocks. An embodiment computes a metric corresponding to a first knowledge block in the plurality of knowledge blocks, the metric evaluating a corpus of content against the first knowledge block. An embodiment identifies, by comparing the metric with the first knowledge block, the first assertion as a contrarian assertion. An embodiment causes an indication of the contrarian assertion to become visually associated with a portion of the first content on a presentation device. Thus, an embodiment provides a method for dynamic contrarian view analysis in natural language content.

In another embodiment, the first knowledge block comprises an assertion of a direction of an indicator and the metric comprises a ratio of upward assertions of the indicator present in the corpus to total assertions of the indicator present in the corpus. Thus, an embodiment provides additional detail of the first knowledge block and the metric used in dynamic contrarian view analysis in natural language content.

In another embodiment, the ratio is weighted by a half-life parameter, the half-life parameter decreasing according to an elapsed time. Thus, an embodiment provides additional detail of the metric used in dynamic contrarian view analysis in natural language content.

An embodiment further comprises computing a novelty metric corresponding to the first knowledge block, the novelty metric evaluating the corpus of content against the first knowledge block, wherein the novelty metric comprises a ratio of assertions of the first knowledge block within a first time period to assertions of the first knowledge block within a second time period, the second time period longer than the first time period. Thus, an embodiment provides additional detail of a novelty metric used in dynamic contrarian view analysis in natural language content.

An embodiment further comprises adding, to the corpus of content, the first content and the plurality of knowledge blocks. Thus, an embodiment provides additional detail of the corpus of content used in dynamic contrarian view analysis in natural language content.

An embodiment further comprises receiving a query comprising a second knowledge block; evaluating, using the metric, the corpus of content against the second knowledge block; identifying, using the metric, a second content within the corpus, the second content comprising an assertion responsive to the query; and causing an indication of the assertion responsive to the query to become visually associated with a portion of the second content on the presentation device. Thus, an embodiment provides additional steps in dynamic contrarian view analysis in natural language content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a continued example of dynamic contrarian view analysis in natural language content in accordance with an illustrative embodiment;

DETAILED DESCRIPTION

Figure 1:
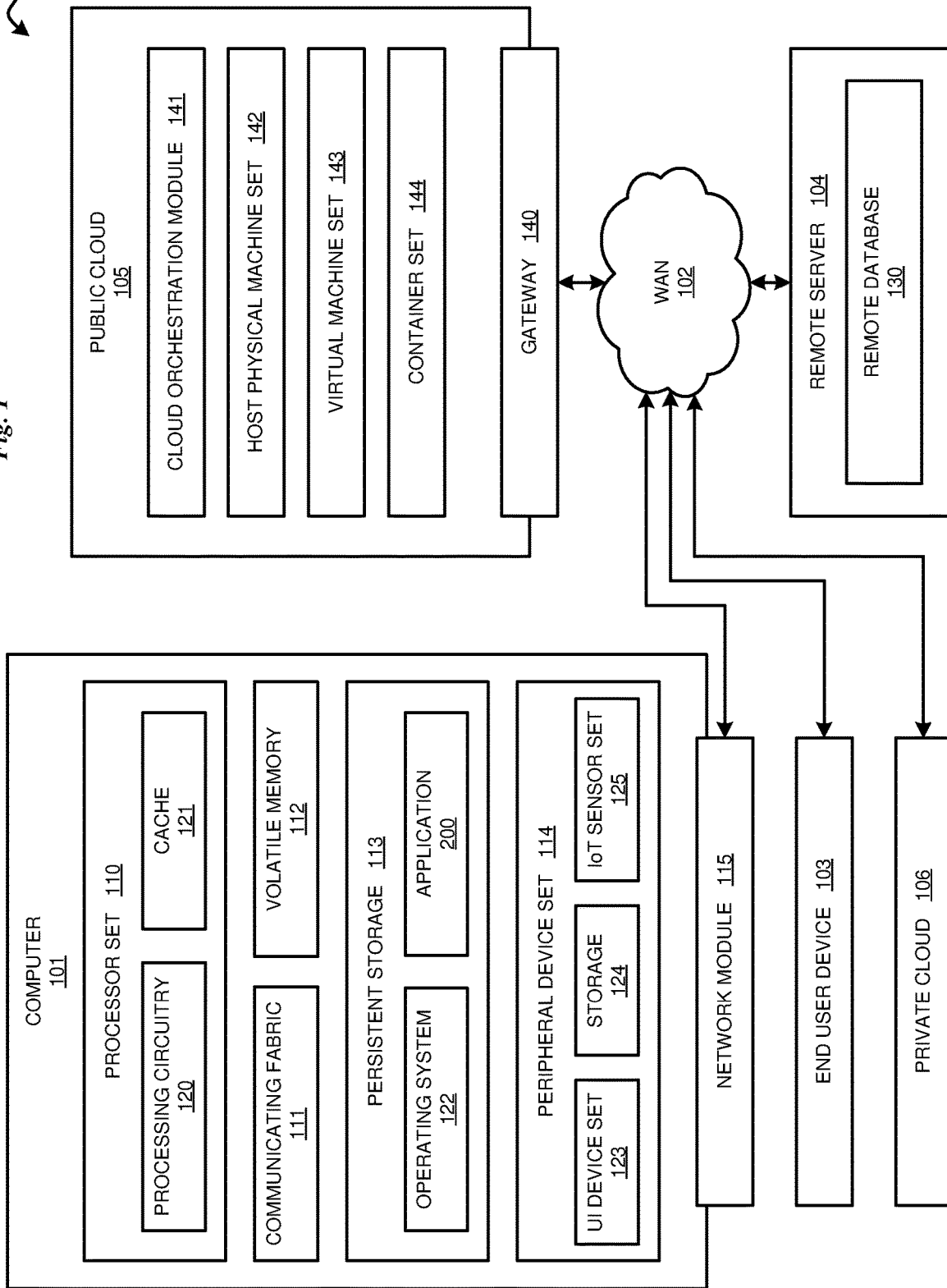
FIG. 1 depicts an example diagram of a data processing environments in which illustrative embodiments may be implemented.

The illustrative embodiments recognize that there is a need to dynamically determine consensus and contrarian views expressed in a corpus of content. The illustrative embodiments recognize that the presently available tools or solutions do not address these needs or provide adequate solutions for these needs. The illustrative embodiments used to describe the invention generally address and solve the above-described problems and other problems related to dynamic contrarian view analysis in natural language content.

An embodiment can be implemented as a software application. The application implementing an embodiment can be configured as a modification of an existing automated natural language content analysis system, as a separate application that operates in conjunction with an existing automated natural language content analysis system, a standalone application, or some combination thereof.

Particularly, some illustrative embodiments provide a method that extracts, from a first content including a first assertion, using a natural language processing engine, a plurality of knowledge blocks, computes a metric corresponding to a first knowledge block in the plurality of knowledge blocks, the metric evaluating a corpus of content against the first knowledge block, identifies, by comparing the metric with the first knowledge block, the first assertion as a contrarian assertion, and causes an indication of the contrarian assertion to become visually associated with a portion of the first content on a presentation device.

An embodiment receives a content, including at least one assertion. One embodiment monitors one or more content sources, continuously or periodically, in order to receive content dynamically. A content, or portion of content, includes a text document expressed a human language, a text document in a structured format such as extensible markup language (XML), speech, video, or a combination of one or more of text, speech, and video. Some non-limiting examples of content are newspaper and magazine articles, books, blog and social media posts, emails, video presentations, audio-video presentations, and the like. Content may be broadcast, streamed, or sourced from a storage location or other repository.

An embodiment uses a natural language processing engine to extract a plurality of knowledge blocks from the content. A natural language processing engine implements presently available techniques that perform speech to text conversion, segment text into words, sentences, or other units, identify named entities, perform entity linking to link words to named entities, extract relationships between named entities, perform semantic role labelling and semantic parsing to understand the roles of words within a sentence, recognize words within one sentence that relate to words in other sentences (e.g., a pronoun referring to a person named in a previous sentence of a content), and the like.

An embodiment uses one or more semantic functions, presently available techniques which analyze content words in a text and dependencies between words. One embodiment breaks a sentence or other textual unit into several components and forms a direct link, called a dependency, between linguistic units of a sentence. An embodiment uses one or more syntactic functions, presently available techniques which analyze the structure of the text. Syntactic analysis is similar to semantic analysis but focuses less on content words and more on the taxonomical structure of a sentence. As part of the syntactic analysis, one embodiment performs part-of-speech tagging to identify nouns, verbs, and other parts of speech within the content. An embodiment uses one or more probabilistic functions, presently available techniques, to analyze content. Another embodiment uses a combination of semantic, syntactic, and probabilistic functions, in parallel with each other.

An embodiment uses a learned feedback loop, in which a machine learning model receives feedback on its performance and uses that feedback to improve its future performance. For example, a model trained on a labeled dataset receives feedback as an evaluation metric such as accuracy or loss. In a learned feedback loop, a model is trained on a labeled dataset using a specific algorithm or set of parameters. A particular evaluation metric evaluates the model's performance on a separate validation dataset. Based on the evaluation, the model receives performance feedback and identifies improvement areas. The model's algorithm or parameters are adjusted to improve the model's performance on the validation dataset. The model is retrained on the labeled dataset using the updated algorithm or parameters. The process repeats until the model's performance on the validation dataset is satisfactory (e.g., an error rate of the model is below a threshold error rate). A learned feedback loop is often an iterative process until the model reaches acceptable performance for the task at hand.

Recall and precision are two metrics that used to evaluate the performance of a classification model. They are often inversely related, meaning that improving one may come at the cost of the other. The trade-off between recall and precision is a common consideration when designing a classification system, because the tradeoff can vary depending on the specific problem and the priorities of the system's users. Recall measures a classifier's ability to identify all relevant instances of a particular class, and is the ratio of the true positive (TP) predictions to the total number of actual positive samples (TP+false negatives (FN)). High recall means that the classifier can find most of the relevant instances, even if it also makes some false positive (FP) predictions. Precision measures a classifier's ability to identify positive instances correctly, and is the ratio of the accurate positive predictions to the total number of positive predictions (TP+FP). High precision means the classifier accurately identifies positive instances, even if it misses some relevant examples. The trade-off between recall and precision arises because improving one metric often leads to a decrease in the other. For example, increasing the threshold for positive predictions can increase precision by reducing the number of false positives, but this can also decrease recall by missing some valid positive instances. Similarly, reducing the threshold can increase recall by finding more true positive samples, but this can decrease precision by increasing the number of false positive predictions. Thus, the recall and precision trade-off balances identifying as many true positive instances as possible (high recall) and minimizing the number of false positives (high precision). The choice between optimizing recall or precision will depend (in this use case) on the requirements of the downstream analysis.

One embodiment uses a learned feedback loop to inactivate or activate computationally expensive tasks depending on downstream needs. Recall and prediction trade-offs are used to evaluate and adjust the model.

In particular, an embodiment extracts, from a portion of content, four types of knowledge blocks: indicators, trends, events, and causal links, and labels knowledge block components appropriately. Not all types of knowledge blocks need be present in each portion of content. Indicators represent time series data, for example gross domestic product (GDP), inflation, the population of a country, Earnings Before Interest, Taxes, Depreciation, and Amortization (EBITDA, a metric used to evaluate a company's operating performance), revenue, expenses, the number of employees of a company, and the like. An indicator also represents non-numerical data that can be quantified, for example by assigning a number to a data category. For example, for the indicator "sky condition", "overcast", "partly cloudy", and "clear" might be possible data categories that could be assigned numbers and graphed in a time series. An indicator includes a key performance indicator (KPI), the metric measured by the time series data an indicator represents. An indicator also, optionally, includes one or more of descriptors describing the indicator, such as location, industry, company or product. Thus, one example indicator might be "Ford sold 250,000 cars this quarter", in which "sold" is the KPI and "Ford", "cars", and "this quarter" are all descriptors describing the indicator Indicators refer to the past (already collected data) or the future (forecast data).

A trend represents a general direction of an indicator over time, for example up (also referred to as an uptrend or a positive view) or down (also referred to as a downtrend or a negative view). Note that while a trend represents a direction, a trend does not represent a sentiment, and trend analysis is not sentiment analysis. Sentiment analysis is the use of natural language processing, text analysis, computational linguistics, and biometrics to systematically identify, extract, and quantify affective states such as happiness, sadness, beauty, ugliness, and the like. While both trend and sentiment analysis use terms such as "positive" and "negative", a positive trend refers to an upward trend in a time series, and a positive sentiment refers to a state such as happy or pretty. Conversely, a negative trend refers to a downward trend in a time series, and a negative sentiment refers to a state such as sad or ugly. For example, in the text "Ford sales this quarter grew by 25% year over year", the indicator is sales and the trend direction is up. In addition, the value of the trend is "25%", because values (as percentages or absolute delta of the underlying indicator) are detected as well. One embodiment classifies trends as either past or future, and as either up or down. Past and future refer to the time of publication of content. For example, an article published in 2019 and forecasting 2020 financial results refers to the future, even though 2020 has already happened. Another embodiment allows for limiting the duration of time periods considered past or future, in queries and query results. Another embodiment uses additional classification categories, for example up, flat, and down, with predefined or user-defined parameters specifying classification boundaries. Other numbers and types of classification categories are also possible and contemplated within the scope of the illustrative embodiments. Trends and indicators have a duration of the measurement (e.g., a year, a quarter, N days, instantaneous) and an offset. The offset is a time difference between the time a statement was made (as published in a content) and the time when the statement will be or has been true. For example, a statement about last quarter has an offset between 0 and −90, while a statement referring to "in a month" has an offset between 28 and 31 depending on the month of the statement).

An event represents something occurring at a specific time and duration (beginning and end point), and is not repeated (and thus is not a time series). An event has a similar data structure to an indicator, and thus includes a base event and optionally, includes one or more of descriptors describing the event. For example, "today's California earthquake" includes a base event ("earthquake") and descriptors ("today", "California").

An embodiment also implements a favorability indicator that applies to KPIs and events. A positive favorability (for example, "revenue" is a KPI with a positive favorability)_means that an upward trend will have a positive result (for the company and its shareholders). A negative favorability (such as the favorability of "greenhouse gas emissions") will indicate that an upward trend for that indicator will have a negative impact on the company or its shareholders. This favorability is used to correctly aggregate KPIs.

A causal link has a cause (also called a driver) and an effect (also called a target). The driver and the target can each be an indicator, a trend, an event, or a causal link. For example, in the phrase "the GDP of the United States went up because exports increased", "GDP" is a KPI, with "United States" as its descriptor. "GDP of the United States went up" is a trend. "Exports" is also a KPI, with "United States" as an implied descriptor, and "exports increased" is a trend. A causal link links "exports increased" (the driver) with "GDP of the United States went up" (the target).

An embodiment uses a predetermined set of synonyms for each known KPI to detect a known KPI within a content. Both known KPIs and their synonyms are stored in an ontology. The ontology also includes, for each KPI, a list of required descriptors, a list of authorized descriptors and a list of not relevant descriptors, among location, industry, company, product. When a required descriptor is missing in the content's context (for example, the content includes "GDP" but does not mention a country), the indicator is not recognized. When an embodiment has found all required descriptors in the context of the KPI, the descriptor is completed with the authorized descriptors. Because descriptors are themselves stored in a tree structure, it is possible to use KPI and descriptors to aggregate indicators, trends and causal links to meaningful levels of generalization. An embodiment performs similar processing for events, although an event can have more than one descriptor of the same type (e.g., a war between two countries, a merger between two companies).

One embodiment uses a taxonomy, a compendium or ontology of relationships between semantic elements, to help in extracting knowledge blocks and labelling knowledge block components appropriately. For example, the taxonomy might include data on particular product lines, and product within those product lines, of a company. The ontology is also useful in aggregating subtypes to sufficiently significant levels for meaningful analysis. For example, one ontology includes one hundred subtypes of KPIs related profit, but aggregating all of them into one "profit" indicator often provides more meaningful results than analyzing each of the individual subtypes. Similarly, aggregating revenue from many countries into one worldwide indicator often provides more meaningful results than analyzing each of the individual countries. Thus, the ontology condenses the essence of the written statements into statistically significant numbers of statements around more generic concepts.

An embodiment computes a metric corresponding to a knowledge block in the plurality of knowledge blocks extracted from the received content. The metric evaluates a corpus of content against the first knowledge block. In one embodiment, the metric is a contrarian view analysis (CVA) metric. In particular, the CVA of a trend is the ratio of the number of uptrends and total trend mentions in the corpus against which some text is analyzed, and measures trends independently of any particular time period, KPI, and level of information. One embodiment determines the CVA of a trend using the $CVA_{\omega, t}$ expression depicted in FIG. 4, in which $T^\uparrow$ denotes an uptrend and $T^\downarrow$ denotes a downtrend. The subscript t refers to the day for which the CVA is computed, with respect to a window w. The parameter $\omega$ refers to a subset of trends. In particular, there are three interesting subsets of trends: trend mentions (in a content) referring to the past, the future, and referring to the future that as time t are still forecast. For example, an article published last week might include a statement saying that interest rates are expected to rise tomorrow. Because the article is a week old, the prediction window has already passed. However, an article published in January 2023 might include a statement that interest rates are expected to increase to 6% by 2024, and in this article the prediction window is still active. The weight w is used to give less importance to statements that are less current than time t. Typically weight is computed using the $w_i$ expression depicted in FIG. 4, in which t refers to the day the CVA is computed for, i refers to the date the trend mention was published and h refers to a half-life. Other implementations of the weight w are also possible and are contemplated within the scope of the illustrative embodiments. $\varepsilon$ and $\theta$ denote hyperparameters. In machine learning, parameters and hyperparameters are critical components of a model, but they have different roles and are optimized differently. Parameters are variables learned during the training process and used to make predictions on new data. In other words, parameters define the functional relationship between a model's input and output variables. Hyperparameters, on the other hand, are variables set before the training process begins and are used to control the behavior of the learning algorithm. In other words, hyperparameters define the structure of the model and how it learns from the data. The critical difference between parameters and hyperparameters is that parameters are learned from the data during training, whereas the user sets hyperparameters before training begins. Optimizing hyperparameters is an integral part of building effective machine-learning models, as choosing the correct hyperparameters can significantly impact the model's performance. By contrast, the goal of training a machine learning model is to optimize the values of the parameters so that they accurately predict new data. Thus, an embodiment implements empirical Bayesian inference by estimating the parameters of a model by using the data itself to construct a prior distribution. The approach involves estimating the prior distribution parameters from the data and then using the resulting before computing the posterior distribution of the model parameters. In other words, instead of using a fixed prior distribution, empirical Bayesian methods allow the data to inform the choice of the prior distribution, resulting in a more data-driven and flexible approach to inference.

An embodiment uses priors to prevent division-by-zero scenarios. In Bayesian analytics, a smoothing prior is a prior distribution used to smooth the posterior distribution of a model. Smoothing priors are often used to improve the stability and generalization of a Bayesian model by adding regularization or bias to the model's parameter estimates. An embodiment chooses the smoothing priors prior to computing the CVA metric. The choice of smoothing prior depends on the specific problem and the characteristics of the data. A well-chosen smoothing prior can improve a Bayesian model's accuracy and stability and help extract more meaningful insights from the data, Weight w indicates how much weight to assign to past events. In particular, a trend has its maximum value, one, when the trend was expressed in content and less than one as a time period between when the trend was expressed and when an analysis is being performed increases. Although the weight is analogous to exponential decay, the weight as used herein need not implement an exponential decay function, and other implementations of the weight are also possible and contemplated within the scope of the illustrative embodiments. In embodiments, the weight is configurable, and can be applied to the metric as a whole (as in the expression described herein) or may vary by indicator, content author or source, amount of overall content or content from a particular source, user preference, or another factor. In one embodiment, the half-life is a hyperparameter, and the embodiment learns new values for this hyperparameter over time by evaluating the outcomes of a specific hyperparameter value and letting the system adjust to this value, and re-analyzing the performance. Other computations for the half-life are also possible and contemplated within the scope of the illustrative embodiments. Although the CVA metric expression described herein refers to trends, another embodiment computes a CVA value similarly for a causal link, event (i.e., the probability of a future event), or an indicator (i.e., fact-checking).

The CVA of a trend has a value between 0 and 1 (or 0%-100%), with 0.5 indicating there are as many uptrends as downtrends. The CVA of a causal link, event, or indicator has a similar meaning.

Another embodiment uses a positive trend percentage (PTP) as a trend CVA. In particular, for a specific indicator, one embodiment selects all trends about this indicator that have been detected in the past W days, where W is a user-defined parameter. Each trend is either positive or negative. An embodiment computes P by summing all the positive trend detections, weighting them with the half-life, so that a trend detection today is worth 1, and a trend detection H days ago is worth 0.5, a detection 2*H days ago is worth 0.25, etc. H is also a user-defined parameter. An embodiment computes N by summing all negative trend detections, weighting them with the half-life. An embodiment computes PTP using the expression PTP=100*(P+1)/(P+N+2). A PTP over 50% indicates there are more positive statements than negative statements. A PTP of 50 is split consensus, and a PTP below 50 indicates there are more negative statements than positive statements. The PTP therefore indicates the general direction of the crowd about the evolution of that indicator. An embodiment compares a trend expressed in a received content with the PTP. If the trend is positive and the PTP is above 50%, there is consensus. If the trend is negative and the PTP is above 50%, the content expresses a contrarian view.

An embodiment does not compute PTP for indicators, but does compute novelty for indicators. Because events are binary (they either happen or do not happen), an embodiment uses PTP to describe an event's probability of happening, by comparing the number of predictions of the event happening vs the total number of predictions. For causal links, an embodiment computes PTP using the direction of the correlation (positive or negative) between the driver and the target of the causal link.

An embodiment identifies, by comparing the metric corresponding to the knowledge block with the knowledge block itself, an assertion in the received content as a contrarian assertion. One interpretation of the CVA of a trend is the percentage of portions of content, in a corpus, that mentions an uptrend regarding an indicator. For example, a value of 0.8 for a particular trend can be considered as a 4:1 ratio, meaning, for every five assertions about that trend four assert that the trend is predicted to increase, while one asserts that the trend is predicted to decrease. Thus, content that also predicts that the trend will decrease is contrarian.

For an indicator aggregating underlying components, the CVA of a trend signifies the percentage uptrends of all mentions underlying the indicator. For example, underlying components for the indicator "ford-profit" might be indicators with child relationships, in the taxonomy, to profit, such as margin or EBITDA. Underlying components for the indicator "ford-profit" might also be profit by location, product, product segment, and industry, for example "ford-profit-china" and "ford-profit-F150". Thus, the trend CVA of "ford-profit" reflects all mentions of subsets of "ford-profit", and the trend CVA of "ford-profit-china" includes all trend mentions of children of profit (e.g., margin, EBITDA) and China (e.g., particular Chinese cities or provinces) across multiple products, segments, and industries.

As another example, consider the CVA for a product line being 0.37, which represents a majority negative consensus at an approximately 3:1 ratio. (Negative, as discussed elsewhere herein, refers to a downward trend in an indicator, not to negative sentiment such as sadness or ugliness.) However, the CVA for one product in the line is 0.78, representing a slightly over a 4:1 positive consensus. Thus, while the overall consensus is negative for the product line as a whole, this single product is highly positive. (Positive, as discussed elsewhere herein, refers to an upward trend in an indicator, not to positive sentiment such as happiness or beauty.) Content extrapolating a predicted uptrend toward the single product as implying a predicted uptrend for the entire product lineup would thus be considered contrarian. Likewise, content predicting a downward trend for the entire product lineup without mentioning the successful single product would also be considered contrarian.

An embodiment identifies, by comparing the metric corresponding to the knowledge block with the knowledge block itself, an assertion in the received content as a novel contrarian assertion. In particular, for a specific knowledge block extracted from the assertion (an indicator, trend, event or causal link), an embodiment computes the number N1 of detections of similar knowledge blocks in the past N time periods (N is a user-defined parameter, for example between 1 and 7 when the time periods are days) and the number N2 of detections of similar concepts in the past T time periods (T is also a configurable parameter, e.g., 100). An embodiment computes a novelty score as a percentage, equal to 100*N1/N2. For example, if the knowledge block is very new, and there have been only three detections of that knowledge block in the past 2 days (and N>=2) then N1=3 and N2=3, so the novelty score is 100%. Note that two knowledge blocks are considered similar, in the novelty computation, if they generalize to the same highest level in the taxonomy. The highest level is World for Location, a listed company for Company, sub-sectors for Industry and ontology dependent for KPIs.

An embodiment presents, or causes presentation of on a presentation device, the received content to a user, by causing an indication of the contrarian assertion to become visually associated with a portion of the received content. For example, one embodiment might present the received content to a user via a user interface, with the contrarian assertion highlighted in a particular color or presented in a different font or style from the remainder of the received content.

One embodiment includes a document reader panel for a list of texts so as to highlight a number of texts at once. If the novelty of a causal link is above a threshold value and thus classified into a "high" category, an embodiment highlights the text that created the link in a color assigned to the novelty category. If a user hovers a pointing device indicator over the link, an embodiment displays the novelty score described elsewhere herein. If the user clicks on the link, if there is more than one content mentioning the same link in the corpus, an embodiment displays in a dedicated new panel the list of documents which mention similar causal links in the past N days. If there are no contents (novelty of 1), an embodiment searches for a generalization of the link (e.g., by industry, country, or KPI) and presents content which provides generalized causal links compared to the link in the current content.

If the novelty of a causal link is below a second threshold value and thus classified into a "low" category, an embodiment compares the direction of the causal link with that of the majority of similar causal links. If the direction matches the direction of the majority of the matching other causal links, an embodiment highlights the text of the causal link with a color specific to Majority Opinion. Upon hovering, an embodiment displays the novelty score and the number of matching causal links in the past N days (or the percentage of matching opinions, larger than 50%). Upon clicking, an embodiment displays in a dedicated new panel the list of documents which mention similar causal links in the past N days. If the direction does not match the direction of the majority of the other causal links, an embodiment highlights the text of the causal link with a color specific to Contrarian Opinion. Upon hovering, an embodiment shows the number of detections that are contrarian, and the number of detections that are matching (or the percentage of matching opinions, smaller than 50%). Upon clicking, an embodiment displays in a dedicated new panel the list of contents which mention similar causal links in the past N days, putting the matching opinions first.

Other user interfaces and presentations of content are also possible and contemplated within the scope of the illustrative embodiments.

An embodiment adds the received content and knowledge blocks extracted from the content to the corpus of content, for use in additional analyses against later received content.

An embodiment receives a query against the corpus. A query can be a single request for information, or a repeated request for information (e.g., for periodic or continuous monitoring of content received into the corpus), and is meant to retrieve at least one knowledge block. For example, one query might request today's novel causal links, while another query might request contrarian views related to stocks in a particular portfolio. An embodiment evaluates, using the CVA metric, the knowledge block in the query against the corpus in a manner described herein. An embodiment presents, or causes presentation of on a presentation device, the query results to a user, by visually associating a query result with a particular portion of content. One embodiment presents query results as individual portions of content, with an indication of the contrarian assertion. Another embodiment presents query results as a list, with a summarized version of some or all of the contrarian assertions, and invites a user to select an item from the list to view as an individual portion of content, with an indication of the contrarian assertion. Another embodiment presents query results in a graph, dashboard, or other pictorial presentation, and invites a user to select a portion of the presentation for additional detail or an individual portion of content, with an indication of the contrarian assertion. Other user interfaces and presentations of query results are also possible and contemplated within the scope of the illustrative embodiments.

The manner of dynamic contrarian view analysis in natural language content described herein is unavailable in the presently available methods in the technological field of endeavor pertaining to natural language content analysis. A method of an embodiment described herein, when implemented to execute on a device or data processing system, comprises substantial advancement of the functionality of that device or data processing system in extracting, from a first content including a first assertion, using a natural language processing engine, a plurality of knowledge blocks, computing a metric corresponding to a first knowledge block in the plurality of knowledge blocks, the metric evaluating a corpus of content against the first knowledge block, identifying, by comparing the metric with the first knowledge block, the first assertion as a contrarian assertion, and causing an indication of the contrarian assertion to become visually associated with a portion of the first content on a presentation device.

The illustrative embodiments are described with respect to certain types of contents, knowledge blocks, indicators, trends, events, causal links, metrics, parameters, presentations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a dynamic contrarian view analysis in natural language content embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IOT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
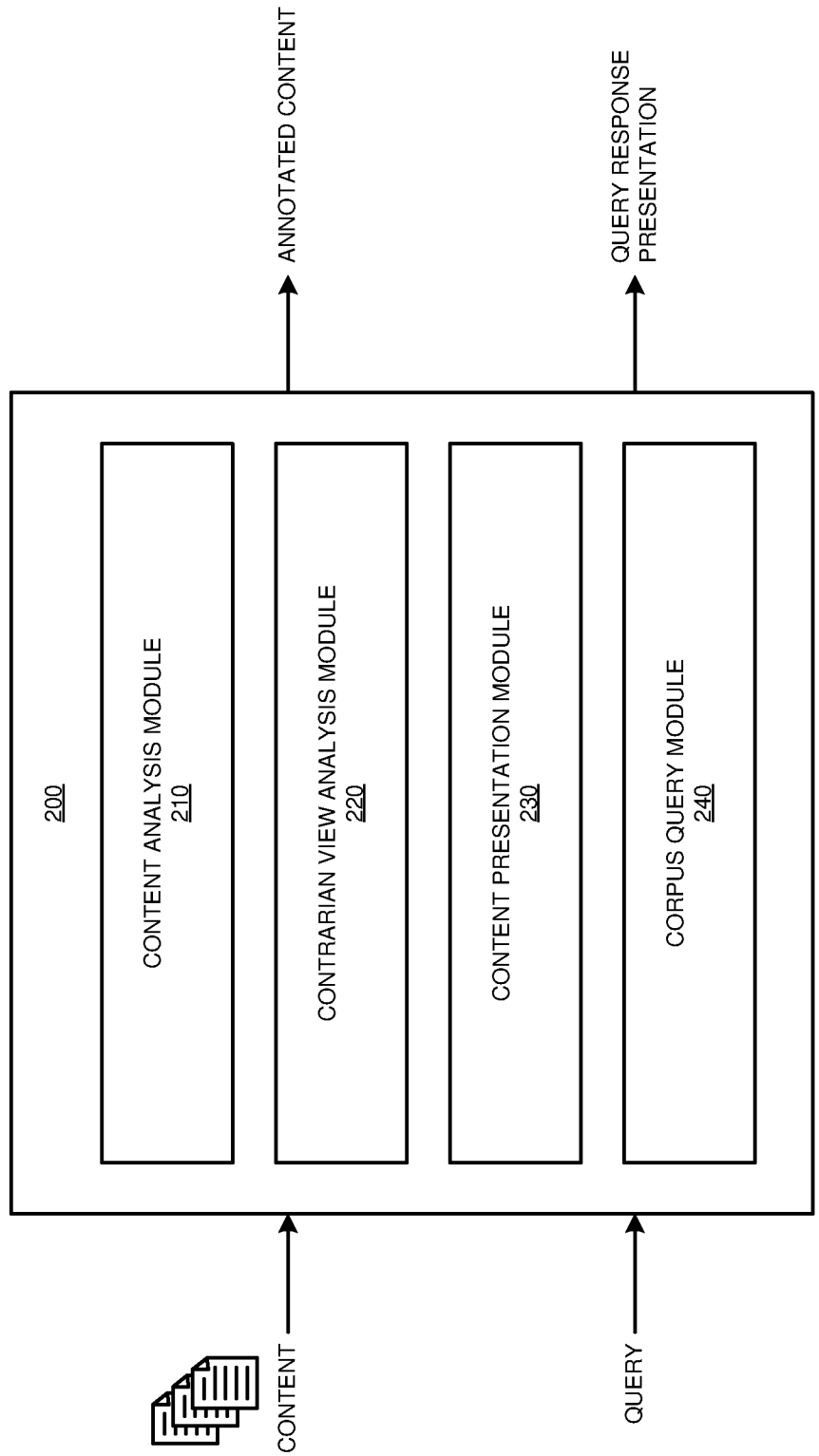
FIG. 2 depicts a block diagram of an example configuration for dynamic contrarian view analysis in natural language content in accordance with an illustrative embodiment.

With reference to FIG. 2, this figure depicts a block diagram of an example configuration for dynamic contrarian view analysis in natural language content in accordance with an illustrative embodiment. Application 200 is the same as application 200 in FIG. 1.

Application 200 receives a content, including at least one assertion. One implementation of application 200 monitors one or more content sources, continuously or periodically, in order to receive content dynamically. A content, or portion of content, includes a text document expressed a human language, a text document in a structured format, speech, video, or a combination of one or more of text, speech, and video. Some non-limiting examples of content are newspaper and magazine articles, books, blog and social media posts, emails, video presentations, audio-video presentations, and the like. Content may be broadcast, streamed, or sourced from a storage location or other repository.

Content analysis module 210 uses a natural language processing engine to extract a plurality of knowledge blocks from the content. A natural language processing engine implements presently available techniques that perform speech to text conversion, segment text into words, sentences, or other units, identify named entities, perform entity linking to link words to named entities, extract relationships between named entities, perform semantic role labelling and semantic parsing to understand the roles of words within a sentence, recognize words within one sentence that relate to words in other sentences (e.g., a pronoun referring to a person named in a previous sentence of a content), and the like.

Module 210 uses one or more semantic functions, presently available techniques which analyze content words in a text and dependencies between words. One implementation of module 210 breaks a sentence or other textual unit into several components and forms a direct link, called a dependency, between linguistic units of a sentence. Module 210 uses one or more syntactic functions, presently available techniques which analyze the structure of the text. Syntactic analysis is similar to semantic analysis but focuses less on content words and more on the taxonomical structure of a sentence. As part of the syntactic analysis, one implementation of module 210 performs part-of-speech tagging to identify nouns, verbs, and other parts of speech within the content. Module 210 uses one or more probabilistic functions, presently available techniques, to analyze content. Another implementation of module 210 uses a combination of semantic, syntactic, and probabilistic functions, in parallel with each other.

Module 210 incorporates a learned feedback loop to improve model performance. In particular, one implementation of module 210 uses a learned feedback loop to inactivate or activate computationally expensive tasks depending on downstream needs. Recall and prediction trade-offs are used to evaluate and adjust the model.

In particular, module 210 extracts, from a portion of content, four types of knowledge blocks: indicators, trends, events, and causal links, and labels knowledge block components appropriately. Not all types of knowledge blocks need be present in each portion of content. Indicators represent time series data, for example gross domestic product (GDP), inflation, the population of a country, Earnings Before Interest, Taxes, Depreciation, and Amortization (EBITDA, a metric used to evaluate a company's operating performance), revenue, expenses, the number of employees of a company, and the like. An indicator also represents non-numerical data that can be quantified, for example by assigning a number to a data category. For example, for the indicator "sky condition", "overcast", "partly cloudy", and "clear" might be possible data categories that could be assigned numbers and graphed in a time series. An indicator includes a key performance indicator (KPI), the metric measured by the time series data an indicator represents. An indicator also, optionally, includes one or more of descriptors describing the indicator, such as location, industry, company or product. Thus, one example indicator might be "Ford sold 250,000 cars this quarter", in which "sold" is the KPI and "Ford", "cars", and "this quarter" are all descriptors describing the indicator. Indicators refer to the past (already collected data) or the future (forecast data).

A trend represents a general direction of an indicator over time, for example up (also referred to as an uptrend or a positive view) or down (also referred to as a downtrend or a negative view). Note that while a trend represents a direction, a trend does not represent a sentiment, and trend analysis is not sentiment analysis. Sentiment analysis is the use of natural language processing, text analysis, computational linguistics, and biometrics to systematically identify, extract, and quantify affective states such as happiness, sadness, beauty, ugliness, and the like. While both trend and sentiment analysis use terms such as "positive" and "negative", a positive trend refers to an upward trend in a time series, and a positive sentiment refers to a state such as happy or pretty. Conversely, a negative trend refers to a downward trend in a time series, and a negative sentiment refers to a state such as sad or ugly. For example, in the text "Ford sales this quarter grew by 25% year over year", the indicator is sales and the trend direction is up. In addition, the value of the trend is "25%", because values (as percentages or absolute delta of the underlying indicator) are detected as well. One implementation of module 210 classifies trends as either past or future, and as either up or down. Past and future refer to the time of publication of content. For example, an article published in 2019 and forecasting 2020 financial results refers to the future, even though 2020 has already happened. Another implementation of module 210 allows for limiting the duration of time periods considered past or future, in queries and query results. Another implementation of module 210 uses additional classification categories, for example up, flat, and down, with predefined or user-defined parameters specifying classification boundaries. Other numbers and types of classification categories are also possible. Trends and indicators have a duration of the measurement (e.g., a year, a quarter, N days, instantaneous) and an offset. The offset is a time difference between the time a statement was made (as published in a content) and the time when the statement will be or has been true. For example, a statement about last quarter has an offset between 0 and −90, while a statement referring to "in a month" has an offset between 28 and 31 depending on the month of the statement).

An event represents something occurring at a specific time and duration (beginning and end point), and is not repeated (and thus is not a time series). An event has a similar data structure to an indicator, and thus includes a base event and optionally, includes one or more of descriptors describing the event. For example, "today's California earthquake" includes a base event ("earthquake") and descriptors ("today", "California").

Module 210 also implements a favorability indicator that applies to KPIs and events. A positive favorability (for example, "revenue" is a KPI with a positive favorability)_means that an upward trend will have a positive result (for the company and its shareholders). A negative favorability (such as the favorability of "greenhouse gas emissions") will indicate that an upward trend for that indicator will have a negative impact on the company or its shareholders. This favorability is used to correctly aggregate KPIs.

A causal link has a cause (also called a driver) and an effect (also called a target). The driver and the target can each be an indicator, a trend, an event, or a causal link. For example, in the phrase "the GDP of the United States went up because exports increased", "GDP" is a KPI, with "United States" as its descriptor. "GDP of the United States went up" is a trend. "Exports" is also a KPI, with "United States" as an implied descriptor, and "exports increased" is a trend. A causal link links "exports increased" (the driver) with "GDP of the United States went up" (the target).

Module 210 uses a predetermined set of synonyms for each known KPI to detect a known KPI within a content. Both known KPIs and their synonyms are stored in an ontology. The ontology also includes, for each KPI, a list of required descriptors, a list of authorized descriptors and a list of not relevant descriptors, among location, industry, company, product. When a required descriptor is missing in the content's context (for example, the content includes "GDP" but does not mention a country), the indicator is not recognized. When module 210 has found all required descriptors in the context of the KPI, the descriptor is completed with the authorized descriptors. Because descriptors are themselves stored in a tree structure, it is possible to use KPI and descriptors to aggregate indicators, trends and causal links to meaningful levels of generalization. Module 210 performs similar processing for events, although an event can have more than one descriptor of the same type (e.g., a war between two countries, a merger between two companies).

One implementation of module 210 uses a taxonomy, a compendium or ontology of relationships between semantic elements, to help in extracting knowledge blocks and labelling knowledge block components appropriately. For example, the taxonomy might include data on particular product lines, and product within those product lines, of a company. The ontology is also useful in aggregating subtypes to sufficiently significant levels for meaningful analysis. For example, one ontology includes one hundred subtypes of KPIs related profit, but aggregating all of them into one "profit" indicator often provides more meaningful results than analyzing each of the individual subtypes. Similarly, aggregating revenue from many countries into one worldwide indicator often provides more meaningful results than analyzing each of the individual countries. Thus, the ontology condenses the essence of the written statements into statistically significant numbers of statements around more generic concepts.

Contrarian view analysis module 220 computes a metric corresponding to a knowledge block in the plurality of knowledge blocks extracted from the received content. The metric evaluates a corpus of content against the first knowledge block. In one implementation of module 220, the metric is a contrarian view analysis (CVA) metric. In particular, the CVA of a trend is the ratio of the number of uptrends and total trend mentions in the corpus against which some text is analyzed, and measures trends independently of any particular time period, KPI, and level of information. One embodiment determines the CVA of a trend using the $CVA_{\omega,t}$ expression depicted in FIG. 4, in which $T^\uparrow$ denotes an uptrend and $T^\downarrow$ denotes a downtrend. The subscript t refers to the day for which the CVA is computed, with respect to a window w. The parameter $\omega$ refers to a subset of trends. In particular, there are three interesting subsets of trends: trend mentions (in a content) referring to the past, the future, and referring to the future that as time t are still forecast. For example, an article published last week might include a statement saying that interest rates are expected to rise tomorrow. Because the article is a week old, the prediction window has already passed. However, an article published in January 2023 might include a statement that interest rates are expected to increase to 6% by 2024, and in this article the prediction window is still active. The weight w is used to give less importance to statements that are less current than time t. Typically weight is computed using the $w_i$ expression depicted in FIG. 4, in which t refers to the day the CVA is computed for, i refers to the date the trend mention was published and h refers to a half-life. Other implementations of the weight w are also possible. $\varepsilon$ and $\theta$ denote hyperparameters. Module 220 implements empirical Bayesian inference by estimating the parameters of a model by using the data itself to construct a prior distribution. Module 220 uses priors to prevent division-by-zero scenarios, choosing priors prior to computing the CVA metric. Weight w indicates how much weight to assign to past events. In particular, a trend has its maximum value, one, when the trend was expressed in content and less than one as a time period between when the trend was expressed and when an analysis is being performed increases. In implementations of module 220, the weight is configurable, and can be applied to the metric as a whole (as in the expression described herein) or may vary by indicator, content author or source, amount of overall content or content from a particular source, user preference, or another factor. In one implementation of module 220, the half-life is a hyperparameter, and module 220 learns new values for this hyperparameter over time by evaluating the outcomes of a specific hyperparameter value and letting the system adjust to this value, and re-analyzing the performance. Other computations for the half-life are also possible. Although the CVA metric expression described herein refers to trends, another implementation of module 220 computes a CVA value similarly for a causal link, event (i.e., the probability of a future event), or an indicator (i.e., fact-checking).

The CVA of a trend has a value between 0 and 1 (or 0%-100%), with 0.5 indicating there are as many uptrends as downtrends. The CVA of a causal link, event, or indicator has a similar meaning.

Another implementation of module 220 uses a positive trend percentage (PTP) as a trend CVA. In particular, for a specific indicator, one implementation of module 220 selects all trends about this indicator that have been detected in the past W days, where W is a user-defined parameter. Each trend is either positive or negative. Module 220 computes P by summing all the positive trend detections, weighting them with the half-life, so that a trend detection today is worth 1, and a trend detection H days ago is worth 0.5, a detection 2*H days ago is worth 0.25, etc. H is also a user-defined parameter. An embodiment computes N by summing all negative trend detections, weighting them with the half-life. Module 220 computes PTP using the expression PTP=100*(P+1)/(P+N+2). A PTP over 50% indicates there are more positive statements than negative statements. A PTP of 50 is split consensus, and a PTP below 50 indicates there are more negative statements than positive statements. The PTP therefore indicates the general direction of the crowd about the evolution of that indicator. Module 220 compares a trend expressed in a received content with the PTP. If the trend is positive and the PTP is above 50%, there is consensus. If the trend is negative and the PTP is above 50%, the content expresses a contrarian view.

Module 220 does not compute PTP for indicators, but does compute novelty for indicators. Because events are binary (they either happen or do not happen), an embodiment uses PTP to describe an event's probability of happening, by comparing the number of predictions of the event happening vs the total number of predictions. For causal links, module 220 computes PTP using the direction of the correlation (positive or negative) between the driver and the target of the causal link.

Module 220 identifies, by comparing the metric corresponding to the knowledge block with the knowledge block itself, an assertion in the received content as a contrarian assertion. One interpretation of the CVA of a trend is the percentage of portions of content, in a corpus, that mentions an uptrend regarding an indicator. For example, a value of 0.8 for a particular trend can be considered as a 4:1 ratio, meaning, for every five assertions about that trend four assert that the trend is predicted to increase, while one asserts that the trend is predicted to decrease. Thus, content that also predicts that the trend will decrease is contrarian.

For an indicator aggregating underlying components, the CVA of a trend signifies the percentage uptrends of all mentions underlying the indicator. For example, underlying components for the indicator "ford-profit" might be indicators with child relationships, in the taxonomy, to profit, such as margin or EBITDA. Underlying components for the indicator "ford-profit" might also be profit by location, product, product segment, and industry, for example "ford-profit-china" and "ford-profit-F150". Thus, the trend CVA of "ford-profit" reflects all mentions of subsets of "'ford-profit", and the trend CVA of "ford-profit-china" includes all trend mentions of children of profit (e.g., margin, EBITDA) and China (e.g., particular Chinese cities or provinces) across multiple products, segments, and industries.

As another example, consider the CVA for a product line being 0.37, which represents a majority negative consensus at an approximately 3:1 ratio. (Negative, as discussed elsewhere herein, refers to a downward trend in an indicator, not to negative sentiment such as sadness or ugliness.) However, the CVA for one product in the line is 0.78, representing a slightly over a 4:1 positive consensus. Thus, while the overall consensus is negative for the product line as a whole, this single product is highly positive. (Positive, as discussed elsewhere herein, refers to an upward trend in an indicator, not to positive sentiment such as happiness or beauty.) Content extrapolating a predicted uptrend toward the single product as implying a predicted uptrend for the entire product lineup would thus be considered contrarian. Likewise, content predicting a downward trend for the entire product lineup without mentioning the successful single product would also be considered contrarian.

Module 220 identifies, by comparing the metric corresponding to the knowledge block with the knowledge block itself, an assertion in the received content as a novel contrarian assertion. In particular, for a specific knowledge block extracted from the assertion (an indicator, trend, event or causal link), module 220 computes the number N1 of detections of similar knowledge blocks in the past N time periods (N is a user-defined parameter, for example between 1 and 7 when the time periods are days) and the number N2 of detections of similar concepts in the past T time periods (T is also a configurable parameter, e.g., 100). Module 220 computes a novelty score as a percentage, equal to 100*N1/N2. For example, if the knowledge block is very new, and there have been only three detections of that knowledge block in the past 2 days (and N>=2) then N1=3 and N2=3, so the novelty score is 100%. Note that two knowledge blocks are considered similar, in the novelty computation, if they generalize to the same highest level in the taxonomy. The highest level is World for Location, a listed company for Company, sub-sectors for Industry and ontology dependent for KPIs.

Content presentation module 230 presents, or causes presentation of on a presentation device, the received content to a user, by causing an indication of the contrarian assertion to become visually associated with a portion of the received content. For example, one implementation of module 230 might present the received content to a user via a user interface, with the contrarian assertion highlighted in a particular color or presented in a different font or style from the remainder of the received content.

One implementation of module 230 includes a document reader panel for a list of texts so as to highlight a number of texts at once. If the novelty of a causal link is above a threshold value and thus classified into a "high" category, the implementation highlights the text that created the link in a color assigned to the novelty category. If a user hovers a pointing device indicator over the link, the implementation displays the novelty score described elsewhere herein. If the user clicks on the link, if there is more than one content mentioning the same link in the corpus, the implementation displays in a dedicated new panel the list of documents which mention similar causal links in the past N days. If there are no contents (novelty of 1), the implementation searches for a generalization of the link (e.g., by industry, country, or KPI) and presents content which provides generalized causal links compared to the link in the current content.

If the novelty of a causal link is below a second threshold value and thus classified into a "low" category, the implementation compares the direction of the causal link with that of the majority of similar causal links. If the direction matches the direction of the majority of the matching other causal links, the implementation highlights the text of the causal link with a color specific to Majority Opinion. Upon hovering, the implementation displays the novelty score and the number of matching causal links in the past N days (or the percentage of matching opinions, larger than 50%). Upon clicking, the implementation displays in a dedicated new panel the list of documents which mention similar causal links in the past N days. If the direction does not match the direction of the majority of the other causal links, the implementation highlights the text of the causal link with a color specific to Contrarian Opinion. Upon hovering, the implementation shows the number of detections that are contrarian, and the number of detections that are matching (or the percentage of matching opinions, smaller than 50%). Upon clicking, the implementation displays in a dedicated new panel the list of contents which mention similar causal links in the past N days, putting the matching opinions first.

Other user interfaces and presentations of content are also possible.

Content analysis module 210 adds the received content and knowledge blocks extracted from the content to the corpus of content, for use in additional analyses against later received content.

Application 200 receives a query against the corpus. A query can be a single request for information, or a repeated request for information (e.g., for periodic or continuous monitoring of content received into the corpus), and is meant to retrieve at least one knowledge block. For example, one query might request today's novel causal links, while another query might request contrarian views related to stocks in a particular portfolio. Corpus query module 240 evaluates, using the CVA metric, the knowledge block in the query against the corpus in a manner described herein. Content presentation module 230 presents, or causes presentation of on a presentation device, the query results to a user, by visually associating a query result with a particular portion of content. One implementation of module 230 presents query results as individual portions of content, with an indication of the contrarian assertion. Another implementation of module 230 presents query results as a list, with a summarized version of some or all of the contrarian assertions, and invites a user to select an item from the list to view as an individual portion of content, with an indication of the contrarian assertion. Another implementation of module 230 presents query results in a graph, dashboard, or other pictorial presentation, and invites a user to select a portion of the presentation for additional detail or an individual portion of content, with an indication of the contrarian assertion. Other user interfaces and presentations of query results are also possible.

Figure 3:
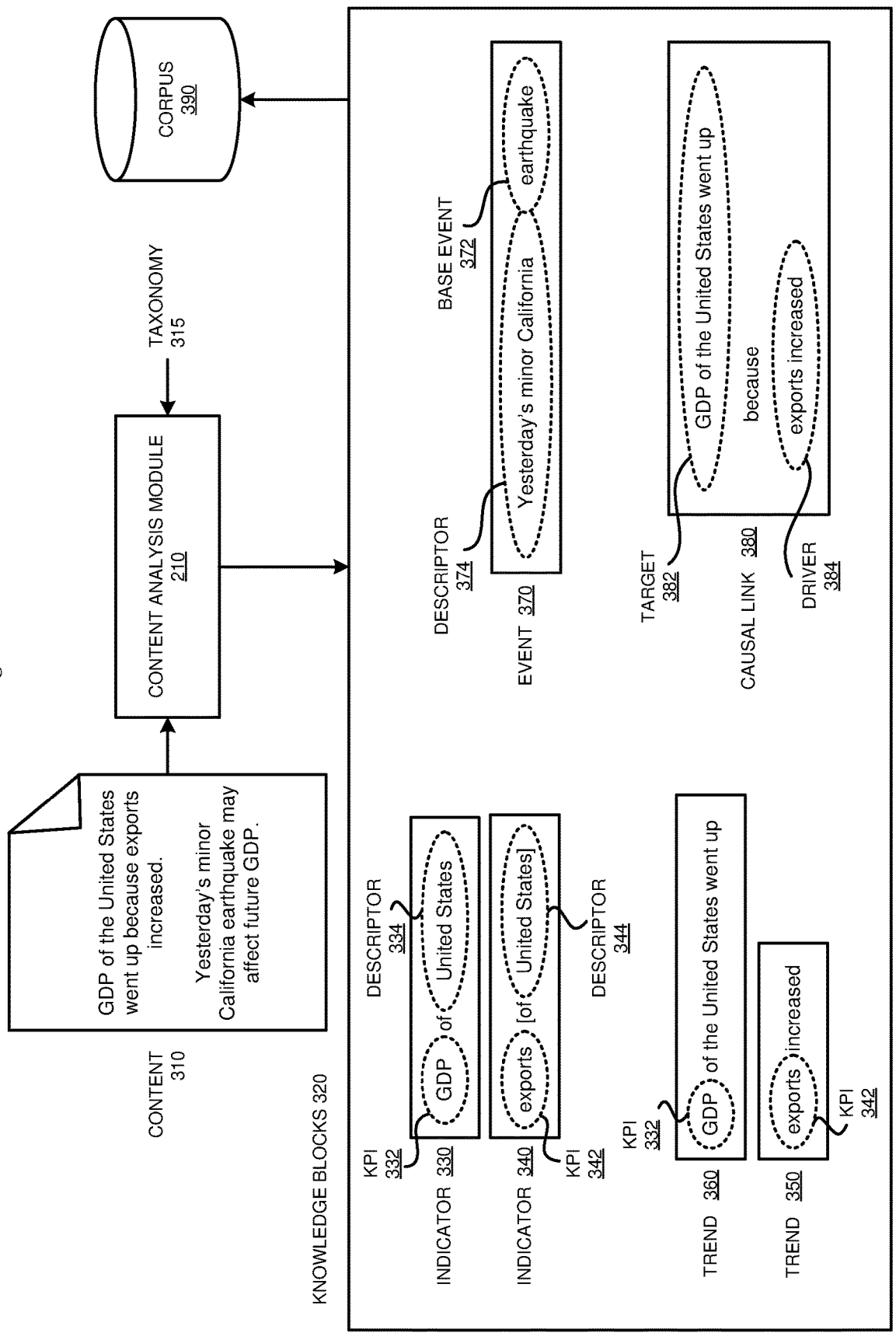
FIG. 3 depicts an example of dynamic contrarian view analysis in natural language content in accordance with an illustrative embodiment.

With reference to FIG. 3, this figure depicts an example of dynamic contrarian view analysis in natural language content in accordance with an illustrative embodiment. The example can be executed using application 200 in FIG. 2. Content analysis module 210 is the same as content analysis module 210 in FIG. 2.

Application 200 receives content 310, including at least one assertion. Content analysis module 210 uses a natural language processing engine and taxonomy 315 to extract knowledge blocks 320 from the content. In particular, module 210 extracts, from content 310, four types of knowledge blocks: indicators, trends, events, and causal links, and labels knowledge block components appropriately. Thus, indicator 330 includes KPI 332 and descriptor 334. Indicator 340 includes KPI 342 and descriptor 344. Trend 350 is a trend of KPI 342. Trend 360 is a trend of KPI 332. Event 370 includes base event 372 and descriptor 374. Causal link 380 includes driver 384 and target 382. Content analysis module 210 adds content 310 and knowledge blocks 320 to corpus 390, for use in additional analyses against later received content.

With reference to FIG. 4, this figure depicts a continued example of dynamic contrarian view analysis in natural language content in accordance with an illustrative embodiment. Trends 350 and 360, and corpus 390, are the same as trends 350 and 360, and corpus 390, in FIG. 3.

In particular, FIG. 4 depicts an expression for computing CVA analysis result 410 from trends 350 and 360, and other content in corpus 390.

Figure 5:
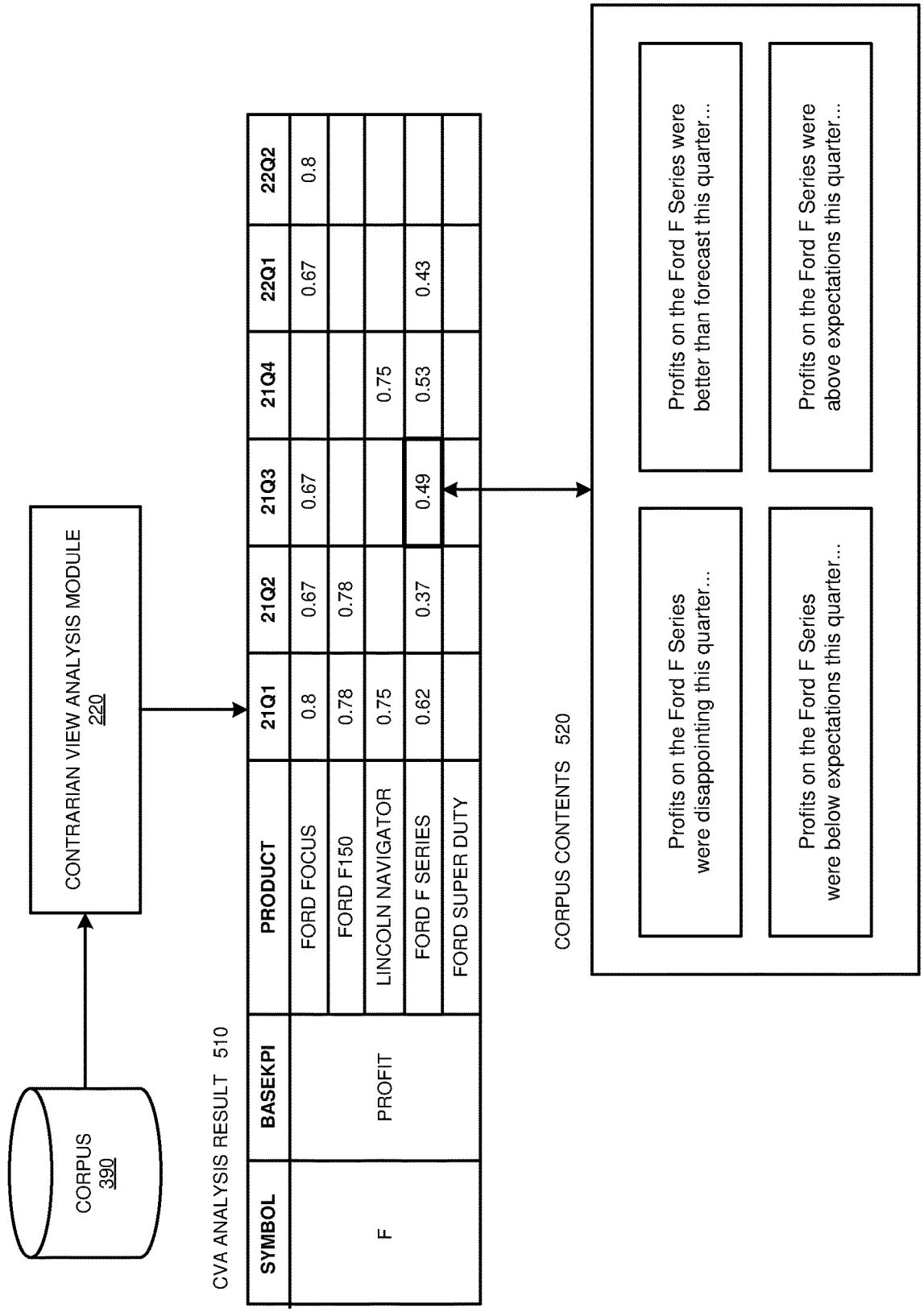
FIG. 5 depicts a continued example of dynamic contrarian view analysis in natural language content in accordance with an illustrative embodiment.

With reference to FIG. 5, this figure depicts a continued example of dynamic contrarian view analysis in natural language content in accordance with an illustrative embodiment. Contrarian view analysis module 220 is the same as contrarian view analysis module 220 in FIG. 2. Corpus 390 is the same as corpus 390 in FIG. 3.

In particular, FIG. 5 depicts CVA analysis result 510, produced by contrarian view analysis module 220 from content in corpus 390. The values in result 510 are CVAs of trends. As depicted, a CVA of approximately 0.5 indicates there are as many uptrends as downtrends. Thus, corpus contents 520 includes as many uptrend assertions as downtrend assertions.

Figure 6:
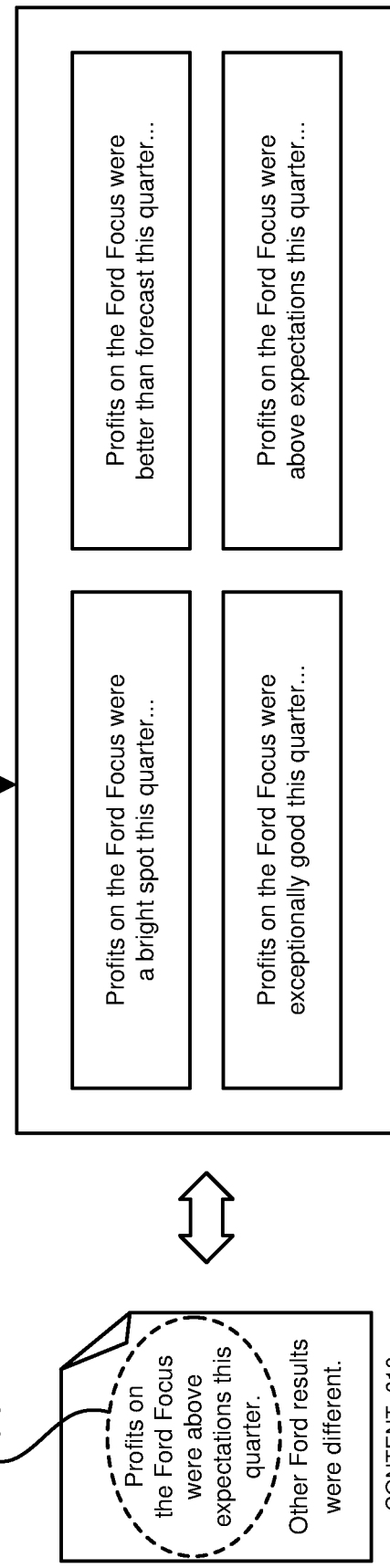
FIG. 6 depicts a continued example of dynamic contrarian view analysis in natural language content in accordance with an illustrative embodiment.

With reference to FIG. 6, this figure depicts a continued example of dynamic contrarian view analysis in natural language content in accordance with an illustrative embodiment. CVA analysis result 510 is the same as CVA analysis result 510 in FIG. 5.

A CVA value of 0.8 for a particular trend can be considered as a 4:1 ratio, meaning, for every five assertions about that trend four assert that the trend is predicted to increase, while one asserts that the trend is predicted to decrease. Thus, content that also predicts that the trend will decrease is contrarian. Corpus contents 620 includes four uptrend assertions; thus content 610, which includes a downtrend assertion, has been labelled as contrarian assertion 615.

Figure 7:
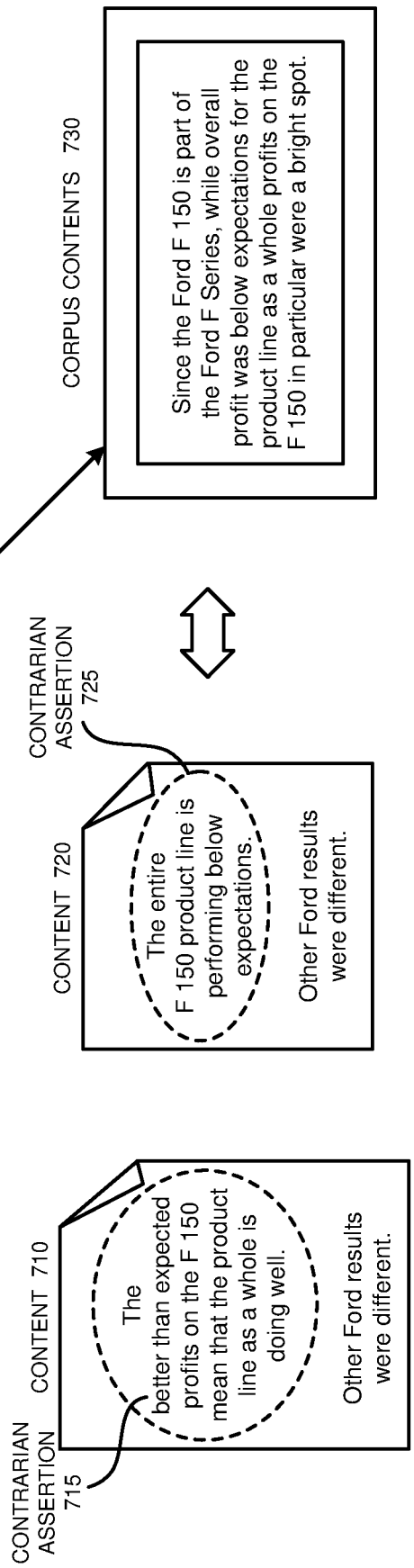
FIG. 7 depicts a continued example of dynamic contrarian view analysis in natural language content in accordance with an illustrative embodiment.

With reference to FIG. 7, this figure depicts a continued example of dynamic contrarian view analysis in natural language content in accordance with an illustrative embodiment. CVA analysis result 510 is the same as CVA analysis result 510 in FIG. 5.

As depicted, the CVA for the Ford F-Series (a product line) is 0.37, which represents a majority negative consensus at an approximately 3:1 ratio. However, the CVA for the F150 (a product in the F-Series line) is 0.78, representing a slightly over a 4:1 positive consensus. Thus, while the overall consensus is negative for the product line as a whole, this single product is highly positive, and corpus contents 730 reflects this. Content extrapolating a predicted uptrend toward the single product as implying a predicted uptrend for the entire product lineup—e.g., content 710—would thus be considered contrarian, and is labelled as contrarian assertion 715. Likewise, content predicting a downward trend for the entire product lineup without mentioning the successful single product—e.g., content 720—would also be considered contrarian, and is labelled as contrarian assertion 725.

Figure 8:
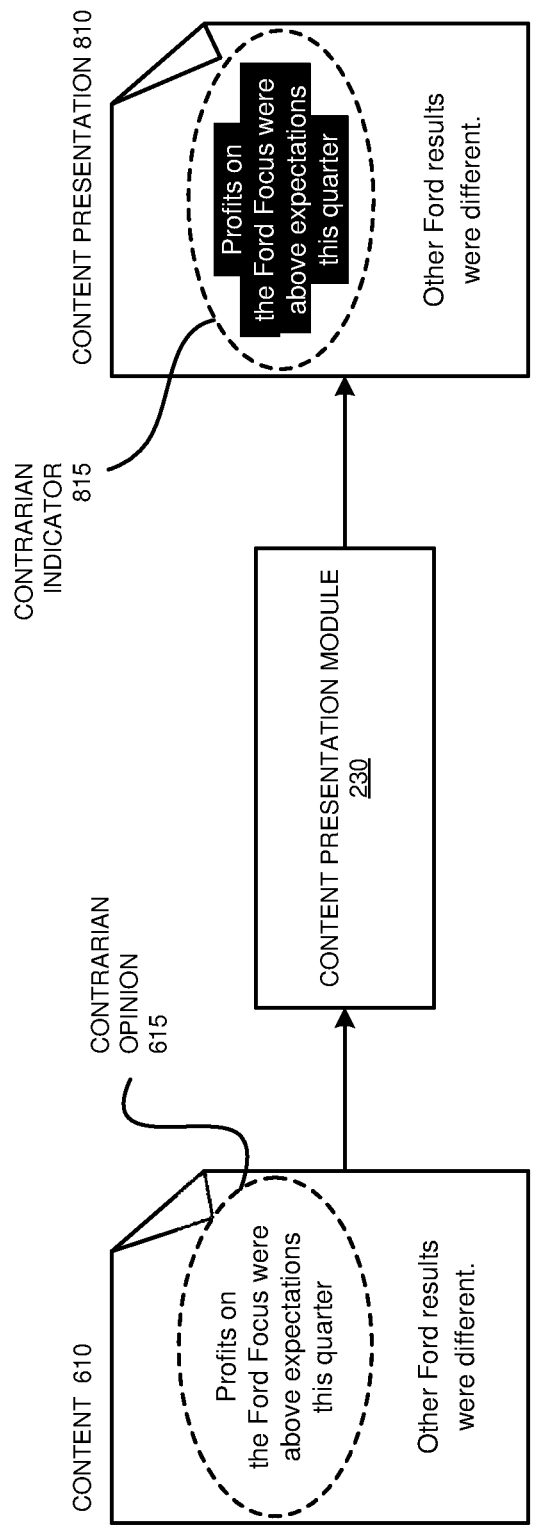
FIG. 8 depicts a continued example of dynamic contrarian view analysis in natural language content in accordance with an illustrative embodiment.

With reference to FIG. 8, this figure depicts a continued example of dynamic contrarian view analysis in natural language content in accordance with an illustrative embodiment. Content presentation module 230 is the same as content presentation module 230 in FIG. 2. Content 610 and contrarian assertion 615 are the same as content 610 and contrarian assertion 615 in FIG. 6.

As depicted, content presentation module 230 presents content 610 and contrarian assertion 615 using content presentation 810, with contrarian indicator 815 highlighted in a particular color.

Figure 9:
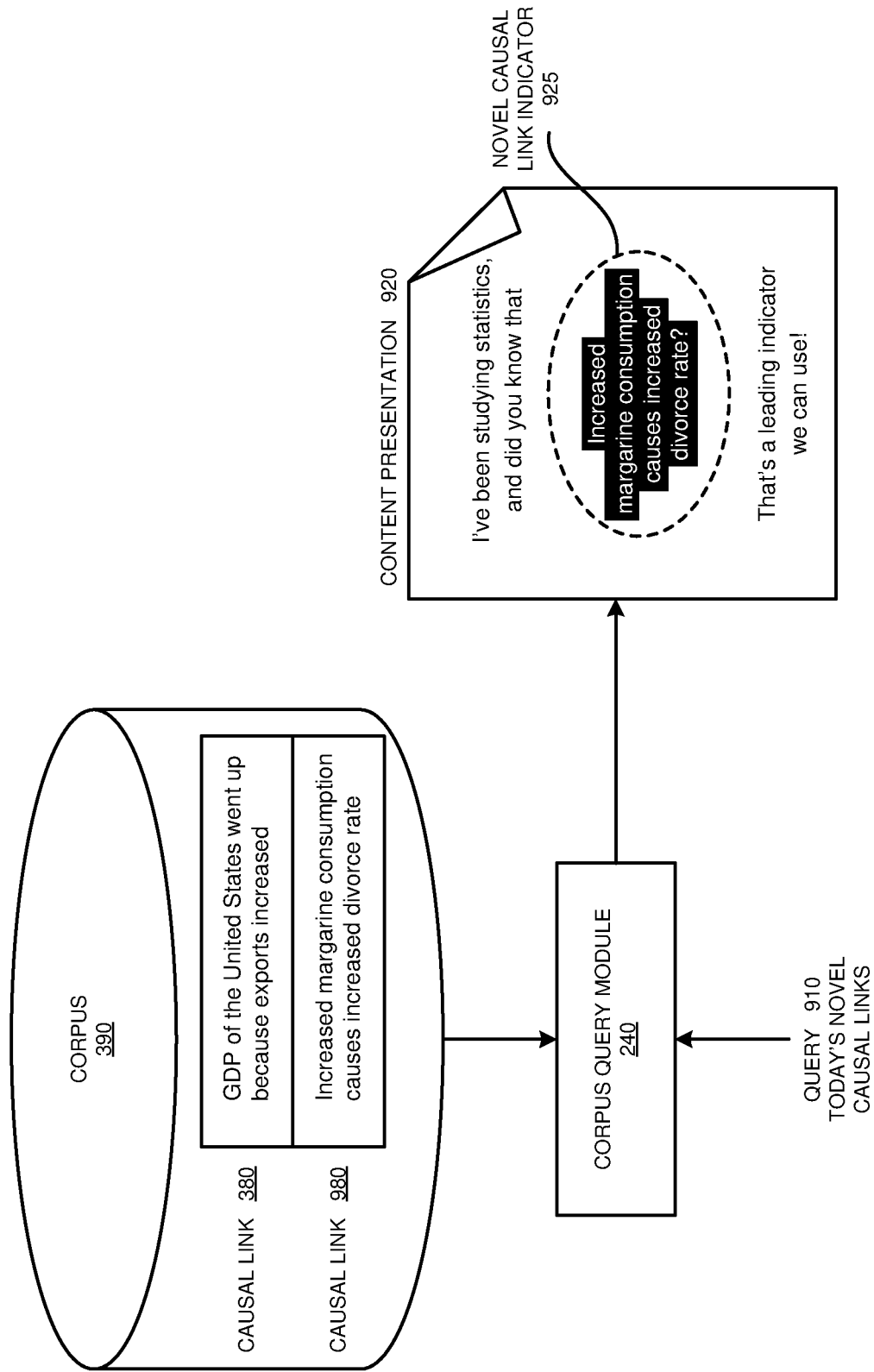
FIG. 9 depicts a continued example of dynamic contrarian view analysis in natural language content in accordance with an illustrative embodiment.

With reference to FIG. 9, this figure depicts a continued example of dynamic contrarian view analysis in natural language content in accordance with an illustrative embodiment. Corpus query module 240 is the same as corpus query module 240 in FIG. 2. Corpus 390 and causal link 380 are the same as corpus 390 and causal link 380 in FIG. 3.

As depicted, application 200 receives query 910, a query against corpus 390. Corpus query module 240 evaluates, using the CVA metric, the knowledge block in the query (causal links) against causal links 380 and 980 in corpus 390 in a manner described herein. The result is content presentation 920, including novel causal link indicator 925.

Figure 10:
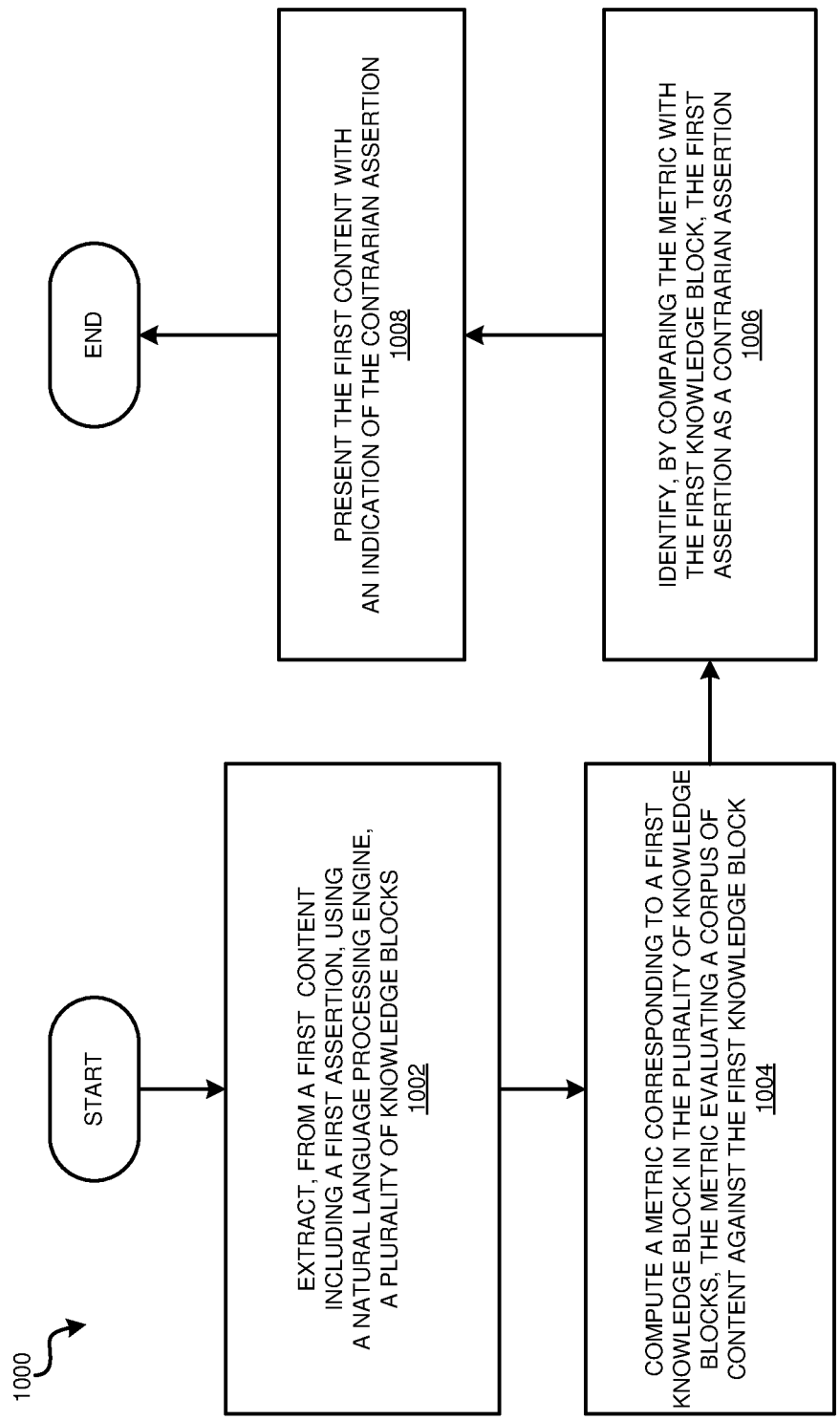
FIG. 10 depicts a flowchart of an example process for dynamic contrarian view analysis in natural language content in accordance with an illustrative embodiment.

With reference to FIG. 10, this figure depicts a flowchart of an example process for dynamic contrarian view analysis in natural language content in accordance with an illustrative embodiment. Process 1000 can be implemented in application 200 in FIG. 2.

In block 1002, the application extracts, from a first content including a first assertion, using a natural language processing engine, a plurality of knowledge blocks. In block 1004, the application computes a metric corresponding to a first knowledge block in the plurality of knowledge blocks, the metric evaluating a corpus of content against the first knowledge block. In block 1006, the application identifies, by comparing the metric with the first knowledge block, the first assertion as a contrarian assertion. In block 1008, the application presents the first content with an indication of the contrarian assertion. Then the application ends.

Thus, a computer implemented method, system or apparatus, and computer program product are provided in the illustrative embodiments for dynamic contrarian view analysis in natural language content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:
   constructing a modified natural language processing (NLP) engine, the constructing comprising:
   enabling the NLP engine to extract, from an input comprising a first content including a first assertion, a plurality of knowledge blocks;
   configuring a computational module to operate with the NLP engine to compute a metric corresponding to a first knowledge block in the plurality of knowledge blocks, the metric evaluating a corpus of content against the first knowledge block, wherein the computational module causes a behavior of the NLP engine to adjust the metric using a half-life hyperparameter on a consensus detected in the corpus;
   further configuring the NLP engine to dynamically determine a contrarian view expressed in a corpus of content by comparing the metric with the first knowledge block and identifying the first assertion as a contrarian assertion, wherein the contrarian assertion is an assertion that has a contrary correlation with the consensus detected in the corpus; and
   causing a presentation device to visually associate an indication of the contrarian assertion with a portion of the first content.

2. The computer-implemented method of claim 1, wherein the first knowledge block comprises an assertion of a direction of an indicator and the metric comprises a ratio of upward assertions of the indicator present in the corpus to total assertions of the indicator present in the corpus.

3. The computer-implemented method of claim 2, wherein the ratio is weighted by a half-life parameter, the half-life parameter decreasing according to an elapsed time.

4. The computer-implemented method of claim 1, further comprising:
   computing a novelty metric corresponding to the first knowledge block, the novelty metric evaluating the corpus of content against the first knowledge block, wherein the novelty metric comprises a ratio of assertions of the first knowledge block within a first time period to assertions of the first knowledge block within a second time period, the second time period longer than the first time period.

5. The computer-implemented method of claim 1, further comprising:
   adding, to the corpus of content, the first content and the plurality of knowledge blocks.

6. The computer-implemented method of claim 1, further comprising:
   receiving a query comprising a second knowledge block;
   evaluating, using the metric, the corpus of content against the second knowledge block;
   identifying, using the metric, a second content within the corpus, the second content comprising an assertion responsive to the query; and
   causing an indication of the assertion responsive to the query to become visually associated with a portion of the second content on the presentation device.

7. A computer program product comprising one or more computer readable storage medium, and program instructions collectively stored on the one or more computer readable storage medium, the program instructions executable by a processor to cause the processor to perform operations comprising:
   constructing a modified natural language processing (NLP) engine, the constructing comprising:
   enabling the NLP engine to extract, from an input comprising a first content including a first assertion, a plurality of knowledge blocks;
   configuring a computational module to operate with the NLP engine to compute a metric corresponding to a first knowledge block in the plurality of knowledge blocks, the metric evaluating a corpus of content against the first knowledge block, wherein the computational module causes a behavior of the NLP engine to adjust the metric using a half-life hyperparameter on a consensus detected in the corpus;
   further configuring the NLP engine to dynamically determine a contrarian view expressed in a corpus of content by comparing the metric with the first knowledge block and identifying the first assertion as a contrarian assertion, wherein the contrarian assertion is an assertion that has a contrary correlation with the consensus detected in the corpus; and
   causing a presentation device to visually associate an indication of the contrarian assertion with a portion of the first content.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
  program instructions to meter use of the program instructions associated with the request; and
  program instructions to generate an invoice based on the metered use.

10. The computer program product of claim 7, wherein the first knowledge block comprises an assertion of a direction of an indicator and the metric comprises a ratio of upward assertions of the indicator present in the corpus to total assertions of the indicator present in the corpus.

11. The computer program product of claim 10, wherein the ratio is weighted by a half-life parameter, the half-life parameter decreasing according to an elapsed time.

12. The computer program product of claim 7, further comprising:
  computing a novelty metric corresponding to the first knowledge block, the novelty metric evaluating the corpus of content against the first knowledge block, wherein the novelty metric comprises a ratio of assertions of the first knowledge block within a first time period to assertions of the first knowledge block within a second time period, the second time period longer than the first time period.

13. The computer program product of claim 7, further comprising:
  adding, to the corpus of content, the first content and the plurality of knowledge blocks.

14. The computer program product of claim 7, further comprising:
  receiving a query comprising a second knowledge block;
  evaluating, using the metric, the corpus of content against the second knowledge block;
  identifying, using the metric, a second content within the corpus, the second content comprising an assertion responsive to the query; and
  causing an indication of the assertion responsive to the query to become visually associated with a portion of the second content on the presentation device.

15. A computer system comprising a processor and one or more computer readable storage media, and program instructions collectively stored on the one or more computer readable storage media, the program instructions executable by the processor to cause the processor to perform operations comprising:
  constructing a modified natural language processing (NLP) engine, the constructing comprising:
    enabling the NLP engine to extract, from an input comprising a first content including a first assertion, a plurality of knowledge blocks;
    configuring a computational module to operate with the NLP engine to compute a metric corresponding to a first knowledge block in the plurality of knowledge blocks, the metric evaluating a corpus of content against the first knowledge block, wherein the computational module causes a behavior of the NLP engine to adjust the metric using a half-life hyperparameter on a consensus detected in the corpus;
    further configuring the NLP engine to dynamically determine a contrarian view expressed in a corpus of content by comparing the metric with the first knowledge block and identifying the first assertion as a contrarian assertion, wherein the contrarian assertion is an assertion that has a contrary correlation with the consensus detected in the corpus; and
  causing a presentation device to visually associate an indication of the contrarian assertion with a portion of the first content.

16. The computer system of claim 15, wherein the first knowledge block comprises an assertion of a direction of an indicator and the metric comprises a ratio of upward assertions of the indicator present in the corpus to total assertions of the indicator present in the corpus.

17. The computer system of claim 16, wherein the ratio is weighted by a half-life parameter, the half-life parameter decreasing according to an elapsed time.

18. The computer system of claim 15, further comprising:
  computing a novelty metric corresponding to the first knowledge block, the novelty metric evaluating the corpus of content against the first knowledge block, wherein the novelty metric comprises a ratio of assertions of the first knowledge block within a first time period to assertions of the first knowledge block within a second time period, the second time period longer than the first time period.

19. The computer system of claim 15, further comprising:
  adding, to the corpus of content, the first content and the plurality of knowledge blocks.

20. The computer system of claim 15, further comprising:
  receiving a query comprising a second knowledge block;
  evaluating, using the metric, the corpus of content against the second knowledge block;
  identifying, using the metric, a second content within the corpus, the second content comprising an assertion responsive to the query; and
  causing an indication of the assertion responsive to the query to become visually associated with a portion of the second content on the presentation device.

* * * * *